United States Patent [19]
Mahlich

[11] Patent Number: 5,464,574
[45] Date of Patent: Nov. 7, 1995

[54] DEVICE FOR THE PREPARATION OF FROTHED MILK FOR CAPPUCCINO

[75] Inventor: Gotthart Mahlich, Kronerg/Ts., Germany

[73] Assignee: Arthur Eugster AG Elektrohaushaltsgeräte, Romanshorn, Switzerland

[21] Appl. No.: 327,496

[22] Filed: Oct. 21, 1994

[30] Foreign Application Priority Data

Dec. 29, 1993 [EP] European Pat. Off. .............. 93121055

[51] Int. Cl.⁶ ....................................................... A47J 31/40
[52] U.S. Cl. .................... 261/124; 261/DIG. 16; 261/DIG. 76; 99/293
[58] Field of Search .................... 261/DIG. 16, DIG. 76, 261/124; 99/293

[56] References Cited

U.S. PATENT DOCUMENTS

| | | | |
|---|---|---|---|
| 1,925,777 | 9/1933 | Sperling | 261/DIG. 16 |
| 2,288,063 | 6/1942 | Ashlock, Jr. | 261/DIG. 16 |
| 4,800,805 | 1/1989 | Mahlich et al. | 261/DIG. 76 |
| 4,922,810 | 5/1990 | Siccardi | 99/293 |
| 4,945,824 | 8/1990 | Borgmann | 261/DIG. 16 |
| 4,960,042 | 10/1990 | Grossi | 261/DIG. 16 |
| 5,122,312 | 6/1992 | Tomalesky | 261/124 |
| 5,335,588 | 8/1994 | Mahlich | 99/293 |
| 5,339,725 | 8/1994 | De'bonghi | 261/DIG. 76 |

Primary Examiner—Tim R. Miles
Attorney, Agent, or Firm—Spencer, Frank & Schneider

[57] ABSTRACT

A device for the preparation of frothed milk includes an a steam pipe arrangement including an inner pipe having one end adapted for connecting to a superheated steam generator of a coffee or espresso maker with superheated steam flowing through the inner pipe during operation, and an outer pipe arranged coaxially with the inner pipe and defining at least one air flow channel between the inner and outer pipes. The pipe arrangement includes an outlet configuration for outputting a mixture of steam and air. The outlet configuration includes at least two outlets arranged for opening directly into a container of milk, with at least one of the outlets being substantially radially-oriented with respect to a longitudinal direction of the steam pipe arrangement and being formed by approximately radial openings in the inner and outer pipes that are aligned with one another.

10 Claims, 2 Drawing Sheets

DEVICE FOR THE PREPARATION OF FROTHED MILK FOR CAPPUCCINO

CROSS-REFERENCE TO RELATED APPLICATIONS

This application claims the right of foreign priority with respect to European application No. 93 121 055.3 filed in the European Patent Office on Dec. 9, 1993, the disclosure of which is incorporated herein by reference.

BACKGROUND OF THE INVENTION

The present invention relates to a device for the preparation of frothed milk for cappuccino (coffee-milk beverage) which has a steam pipe connected to a superheated steam generator of a coffee or espresso maker with superheated steam flowing through the steam pipe during operation and with the superheated steam leaving the steam pipe via an outlet configuration while being mixed with air and, as needed, with milk.

Numerous embodiments of such devices are known in the prior art. Common to many of the known embodiments is the feature that the mix leaves the steam pipe in an axial direction through a single outlet. This, however, bears the risk that milk in the immediate area around the outlet nozzle becomes overheated when the lower end of the steam pipe plunges into a container filled with milk. If, in the preparation of cappuccino, milk is heated almost up its boiling point, the milk can no longer produce frothed milk of the quality required for cappuccino.

An example of the above prior art includes German Offenlegungsschrift 3,942,713 (published nonexamined application), European Offenlegungsschrift 0,472,727 (published nonexamined application), and the yet to be published European patent application 93 108 838.69 of Applicant (corresponding to U.S. patent application Ser. No. 08/082,468 to Mahlich, now U.S. Pat. No. 5,335,588).

European Patent 0,555,766.A1 to Moulinex discloses a device for preparation of frothed milk that includes a radial outlet. However, the construction is very expensive. In particular, a separate part must be provided which is disposed between the steam pipe and an outer pipe, and which has a very complicated shape. Bores must be cut into this configuration to form the flow channels and nozzles. Moreover, the outer pipe must be disposed on the underside and at a distance from an intermediate piece to form the radial flow channels. Two further preferred embodiments are disclosed in this document in which the steam/air mixture discharges through a radial outlet into a pipe piece having an axial outlet which is intended to prevent spraying of the mixture.

French Application 2,638,083 by Fregnan discloses a device for preparing cappuccino which has a radial outlet that discharges into a chamber having an axial outlet. Also, in this case Laval nozzles, which are complicated to produce, are used.

SUMMARY OF THE INVENTION

It is an object of the present invention to avoid the drawbacks of the prior art devices.

It is another object of the invention to provide a device which, in as simple a construction as possible, prevents the milk from overheating during operation.

The above and other objects are accomplished according to the invention by a device for the preparation of frothed milk, comprising: a steam pipe arrangement including an inner pipe having one end adapted for connecting to a superheated steam generator of a coffee or espresso maker with superheated steam flowing through the inner pipe during operation and an outer pipe arranged coaxially with the inner pipe and defining with the inner pipe at least one air flow channel between the inner and outer pipes, the steam pipe arrangement including an outlet configuration for outputting a mixture of steam and air, the outlet configuration including at least two outlets arranged for opening directly into a container of milk, with at least one of the outlets being substantially radially-oriented with respect to a longitudinal direction of the steam pipe arrangement and being formed by approximately radial openings in the inner and outer pipes that are aligned with one another.

The invention thus provides the advantage that the effluent and hot mixture are distributed to at least two outlets and this distributes the hot mixture over a larger milk volume in the container into which the lower end of the steam pipe is plunged. This avoids disadvantageous overheating of the milk or the mixture.

Preferably, all mixture outlets are aligned radially in relation to the steam pipe and they should generally be provided at the steam pipe's lower end. Alternatively, an outlet is provided in the axial extension of the steam pipe with at least one other of the mixture outlets being aligned radially in relation to the steam pipe.

A radial configuration of all outlets is preferred because this achieves the largest possible spatial distances between the heating zones in the container. In relation to each other, these outlets should be positioned at identical angular distances relative to one another so that the heating zones are as far apart from each other as possible to allow for good heat distribution in the container or in the milk or mixture located in the container. Such an embodiment with a radial configuration of all outlets is also particularly simple in its construction.

The invention further provides for structural simplification in that the wall of the flow channel for the air is formed between the two concentrically arranged pipes and because the radially-oriented outlets are formed by openings in the two pipes which are aligned with one another. This simple structure of two pipes disposed coaxially with respect to one another and forming the air flow channel directly between the two pipes completely eliminates the intermediate piece required according to aforementioned prior art.

The aligned radial openings according to the invention do not have to be arranged concentrically, even though this is advantageous. Furthermore, the openings may have identical cross sections, although the openings in the outer pipe preferably has a larger cross section than the openings in the inner pipe. In this preferred embodiment a pressure reduction occurs in the transition area between the two openings with the different cross sections, and it is in this area that the air is then sucked in.

The aforementioned openings may be implemented in a suitable manner, for instance, as bore holes. With regard to the opening of the inner pipe, it is conceivable that the cross section of the opening is critical and, in such a case, the opening of the inner pipe preferably is configured as a milling cut originating at the free edge of the pipe. A milling cut of this type is easier to produce than a bore hole, and, most importantly, the free cross section can be controlled more easily.

Milk may also be sucked in and mixed by the device according to the invention. If desired, this may be accomplished by having an intake orifice lead into the area where the two aligned openings are located. The milk is then sucked out of the container into which the lower end of the steam pipe arrangement of the device is plunged.

In order to assist in preventing the milk from overheating, the outer pipe and an end closure plate of the device are preferably made of plastic, i.e., of a heat insulating material.

The exterior of the outer pipe and, possibly, the exterior of the closure plate may be metallized. This facilitates the cleaning of these parts and also enhances the appearance of the device.

Normally, the frothing container (milk cup) of such espresso or coffee makers is hand-held and is lifted from below the steam pipe so that the frothing head of the steam pipe plunges into the milk located in the container. It may, however, be advantageous for the container to be secured at the machine in a detachable manner while still providing the option of frothing the milk. This advantageous feature is accomplished by the invention by providing an opening in the bottom of the container into which the steam pipe can be inserted from below the container.

Owing to the fact that, according to the invention, the superheated steam is discharged radially in relation to the steam pipe, the steam pipe can be plunged into the container from the bottom and, during operation, the liquid does not splash upward as would be the case if the superheated steam would leave the steam pipe in an axial direction.

This embodiment of the invention results in a noticeable improvement in ease of operation of such espresso and coffee makers. The frothing container can easily be pulled off the steam pipe's frothing head, for instance for cleaning purposes, and it is placed back afterwards. The device is then operational again.

In order to keep any milk located in the container from flowing through the steam outlets downward into the steam pipe when superheated steam is not carried through the pipe, the frothing head outlets preferably are sealable.

Such sealing and reopening preferably is accomplished via a vertical movement of a seal which, in turn, preferably is connected to a valve that opens and closes the steam pipe. The opening of the steam pipe thus opens the steam outlets of the steam pipe's frothing head and the sealing of the steam pipe recloses these outlets. This is accomplished by a suitable mechanical coupling.

BRIEF DESCRIPTION OF THE DRAWINGS.

The invention is described below on the basis of embodiments which illustrate important additional characteristics.

DETAILED DESCRIPTION OF THE PREFERRED EMBODIMENTS

Figure 1:
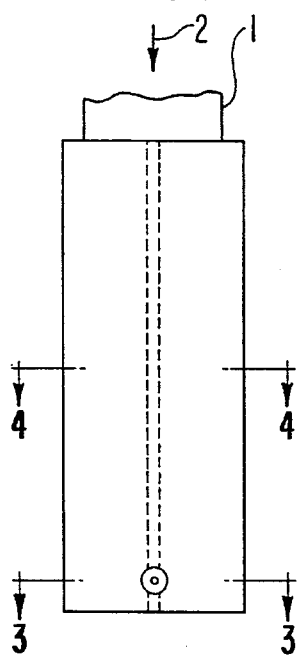
FIG. 1 is a side elevation of the device according to the invention.
Figure 2:
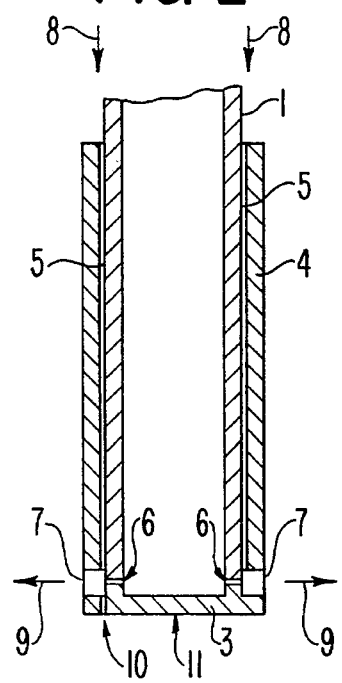
FIG. 2 a longitudinal sectional view of the device according to FIG. 1.
Figure 3:
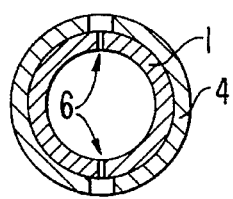
FIG. 3 is a sectional view along line 3—3 of FIG. 1.

Referring to FIGS. 1 to 4, there is shown an inner steam pipe 1 having an upper end adapted for connection to a superheated steam generator (not shown) of a coffee or espresso maker (also not shown) so that, during operation, superheated steam flows through the inner steam pipe in the direction of arrow 2 in FIG. 1. The lower end of the steam pipe is closed off with an end closure plate 3 (FIG. 2).

Figure 4:
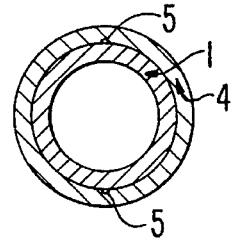
FIG. 4 is a sectional view along line 4—4 of FIG. 1.

Inner steam pipe 1 is surrounded by an outer pipe 4 with at least one channel 5 for air being provided in a suitable manner between the two pipes 1, 4. FIG. 4 shows two channels 5 provided in this embodiment, namely, by axial bore holes on the interior side of outer pipe 4 and/or on the exterior side of inner pipe 1.

At its lower end, inner steam pipe 1 has at least one radial outlet 6 directed outwardly with which an opening 7, also configured radially, in outer pipe 4 is in alignment.

During operation, superheated steam leaves steam pipe 1 through openings 6, 7, while air is sucked into channels 5 in the direction of arrow 8 and enters the area of the widened cross section between openings 6, 7 where the air is thus entrained to form the hot mixture necessary for cappuccino preparation, which mixture then enters the milk in the direction of arrow 9. The container holding the milk into which the shown device plunges with its lower end is not shown in the drawings.

The lower left of FIG. 2 indicates one embodiment of the invention where a further bore hole or orifice 10 is provided through which milk is sucked in, with the milk then also being added to the mixture. The lower right of FIG. 2 shows an embodiment according to the invention where no such bore hole for milk is provided.

Figure 5:
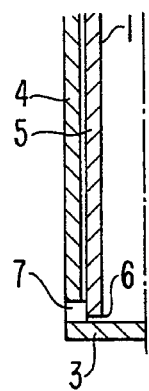
FIG. 5 is a partial sectional view of a lower left portion of a device in similar to FIG. 2 but showing a modified embodiment as compared to FIG. 2.

As shown in FIG. 2, openings 6, 7 are arranged concentrically in relation to each other. FIG. 5 shows an alternative arrangement where instead of concentric openings, opening 6 of the inner pipe originates at the free end of inner pipe 1.

The preferred embodiment which is shown in the drawings is one where all outlets are configured radially. It would also be within the scope of the invention, however, to provide for an axial outlet in the location indicated by arrow 11, which would then be located in closure plate 3.

Thus it is obvious that outlet nozzles, i.e., openings with constantly changing cross sections do not necessarily have to be provided, as is always the case in the prior art.

The fact that the invention has at least two outlets for the generated mixture results in the heating of smaller milk volumes and the distribution of the steam generator's thermal energy over a larger area, which avoids the risk of milk overheating. This effect is enhanced further if, as is preferable, all outlets 6, 7 are configured radially in relation to steam pipe 1 as shown in the drawings.

To the extent that one of the outlets is arranged axially (not shown), air must also be mixed into it. This may be accomplished, for example, by closing off one of the radial openings 7 of FIG. 2 so that air is added to this axial opening (at position 11 in FIG. 2) via associated opening 6.

The requirement for radial alignment of outlets in accordance with the invention does not mean that the outlet must necessarily be directed at an angle of 90° relative to the steam pipe axis, although this is preferable for construction purposes. Angles greater or smaller than 90° may also be executed as long as the task of the present invention is solved.

Figure 6:
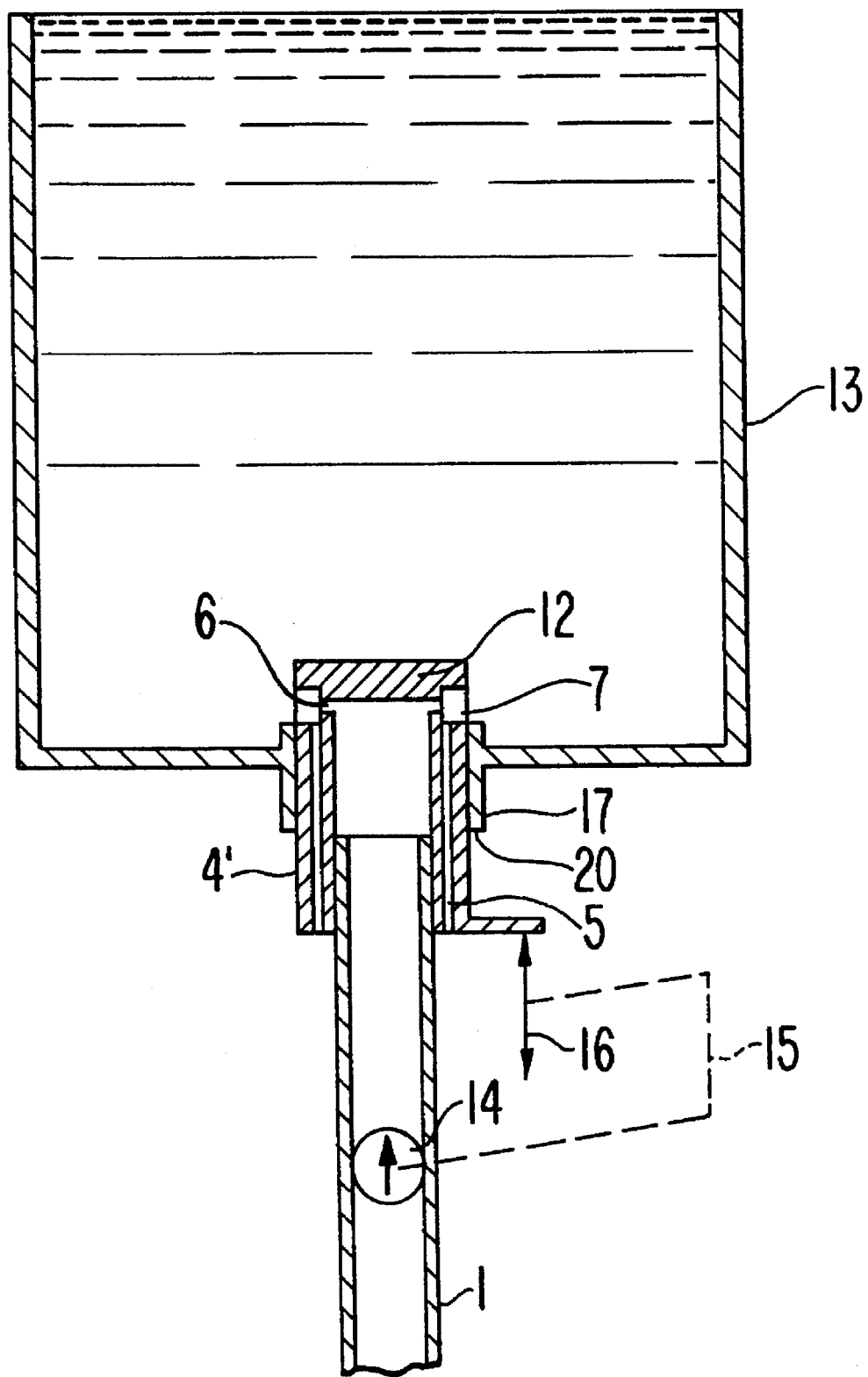
FIG. 6 is a longitudinal section of a device according to another embodiment of the invention.

FIG. 6 shows a modified embodiment of the invention in which steam pipe 1 with its frothing head 12 is inserted from below into the bottom of a frothing container 13 which is equipped with a suitable opening 20 for this purpose.

The steam outlet of steam pipe 1 can be opened and closed via a valve 14 which is mechanically connected to outer pipe 4, indicated by the dashed line 15, which lifts and lowers an outer pipe 4', or a frothing head 12 as a whole, in the direction of double arrow 16.

Opening 20 is surrounded by ring-type nipple 17 so that, when movement takes place in the direction of arrow 16 relative to container 13 which is detachably secured to the housing, openings 7 are opened or closed via corresponding actuation of valve 14.

For purposes of simplification, various seals which would be utilized in a practical implementation of the invention as a person of ordinary skill in the art would readily recognize, are not shown in the drawings.

A frothing container is also utilized in the embodiments shown in FIGS. 1 through 5, however it would not be provided with a bottom opening as in the embodiment of FIG. 6. In the embodiment of FIGS. 1 through 5, the container is guided from below over the steam pipe's frothing head so that the frothing head plunges into the milk in the container.

Although preferred embodiments of the invention have been described, it is to be understood that various modifications would be obvious to those skilled in the art and are embodied within the present invention as defined by the appended claims.

What is claimed is:

1. A device for the preparation of frothed milk, comprising:

a steam pipe arrangement including an inner pipe having one end adapted for connecting to a superheated steam generator of a coffee or espresso maker with superheated steam flowing through the inner pipe during operation and an outer pipe arranged coaxially with said inner pipe and defining with said inner pipe at least one air flow channel between said inner and outer pipes, said steam pipe arrangement including an outlet configuration for outputting a mixture of steam and air, said outlet configuration including at least two outlets arranged for opening directly into a container of milk, with at least one of said outlets being substantially radially-oriented with respect to a longitudinal direction of the steam pipe arrangement and being formed by approximately radial openings in said inner and outer pipes that are aligned with one another.

2. The device according to claim 1, wherein said steam pipe arrangement includes an intake orifice for milk that leads into an area of the aligned radial openings.

3. The device according to claim 1, wherein said outlet configuration includes a plurality of radially aligned outlets that are arranged at substantially identical angular distances from each other.

4. The device according to claim 1, wherein the radial opening in said outer pipe has a larger cross section than the radial opening in said inner pipe.

5. The device according to claim 1, wherein said inner pipe has a free end face and the radial opening in said inner pipe comprises a milling cut originating at said free end face.

6. The device according to claim 1, wherein said steam pipe arrangement includes an end closure plate, and the outer pipe and said end closure plate are made of plastic.

7. The device according to claim 6, wherein said steam pipe arrangement includes exterior surfaces that are metallized.

8. The device according to claim 1, wherein all outlets in said outlet configuration are aligned radially in relation to the longitudinal axis of the steam pipe arrangement.

9. The device according to claim 8 forming a combination with a frothing container, wherein said frothing container includes a container bottom having an opening for inserting the outlet configuration of said steam pipe arrangement.

10. The device according to claim 9, including means for sealing the outlets of said outlet configuration.

* * * * *